UNITED STATES PATENT OFFICE.

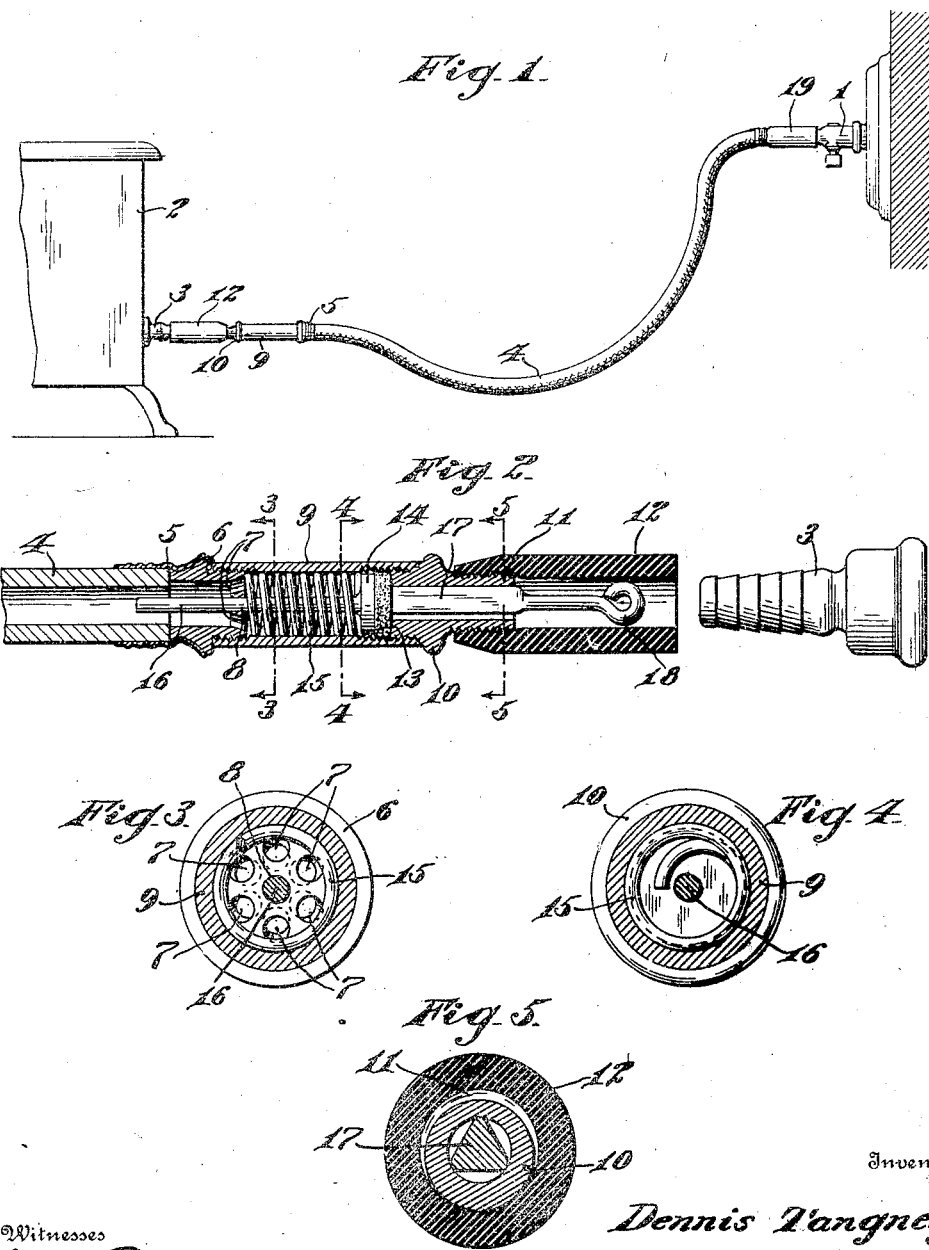

DENNIS TANGNEY, OF PHILADELPHIA, PENNSYLVANIA.

SAFETY CONNECTION FOR GAS-FIXTURES.

937,891.      Specification of Letters Patent.      Patented Oct. 26, 1909.

Application filed May 17, 1909. Serial No. 496,388.

*To all whom it may concern:*

Be it known that I, DENNIS TANGNEY, a citizen of the United States, residing at Philadelphia, in the county of Philadelphia and State of Pennsylvania, have invented certain new and useful Improvements in Safety Connections for Gas-Fixtures, of which the following is a specification.

My invention relates to an improved safety connection for gas fixtures, the object of the invention being to provide a spring-pressed valve within the gas pipe, so that said valve will be open when the tube or pipe is forced onto a ribbed extension, and will be automatically closed when the tube, either through accident or design is removed from the ribbed extension, thus obviating any possibility of the escape of gas in the event of accidental disconnection of the pipe or tube.

With these and other objects in view, the invention consists in certain novel features of construction, and combinations and arrangements of parts as will be more fully hereinafter described and pointed out in the claims.

In the accompanying drawings, Figure 1, is a view in elevation illustrating the application of my improvements. Fig. 2, is an enlarged fragmentary view in longitudinal section. Fig. 3, is a view in section on the line 3—3 of Fig. 2. Fig. 4, is a view in section on the line 4—4 of Fig. 2, and Fig. 5, is a view in section on the line 5—5 of Fig. 2.

1 represents a gas supply cock, and 2 a gas stove having an ordinary ribbed extension 3 thereon, and 4 is the pipe or tube connecting the cock 1 with the ribbed extension 3. This tube 4 at one end is secured by a metal collar 5 to a coupling 6, the latter having a series of gas passages 7, and a central opening 8. This coupling 6 is externally screw threaded to receive a metal tube 9, and the latter is internally screw threaded at both ends, and is also screwed upon the threaded end of a coupling 10, and the latter has a threaded or ribbed end 11 to which an elastic sleeve 12 is secured, and adapted to be forced onto the ribbed extension 3. This coupling 10 is of tubular form, and provides a valve seat 13 on its inner end against which a valve 14 is normally seated by a coiled spring 15 within the tube 9, and bearing at its ends against couplings 6 and valve 14. This valve has a guide stem 16, which projects through the central opening 8 in coupling 6, and is also provided with a forward extension 17, angular in cross section where it passes through the tubular coupling 10, and at its free end is bent forming an enlargement 18, to be engaged by the ribbed extension 3, to force the valve 14 from its seat and allow a free passage of gas. The other end of the tube is shown provided with an ordinary elastic sleeve 19, but may also have the safety mechanism above explained if so desired.

The operation is as follows: When the elastic sleeve 12 is forced onto the ribbed extension 3, the valve will be forced backward from its seat and the gas may freely flow to the stove or other fixture. If the elastic sleeve 12 is drawn off the extension 3, either through accident or design, spring 15 will immediately force valve 14 against its seat, and prevent any escape of gas, thus obviating any possibility of accidents, due to this very frequent cause.

Various slight changes might be made in the general form and arrangement of parts described without departing from my invention, and hence I do not restrict myself to the precise details set forth, but consider myself at liberty to make such changes and alterations as fairly fall within the spirit and scope of the claims.

Having thus described my invention what I claim as new and desire to secure by Letters Patent is:

1. In a device of the character described, the combination with a tube, an elastic sleeve, and couplings secured to said tube and said elastic sleeve, a metal tube connecting said couplings, a spring-pressed valve in said tube normally closing the passage through the coupling secured to the elastic sleeve, and an extension on said valve projecting through the said last mentioned coupling and into the elastic sleeve.

2. In a device of the character described, the combination with a tube and an elastic sleeve, of tubular couplings connected to the tube and sleeve, a metal tube connecting said couplings, a spring-pressed valve seated against the coupling secured to the sleeve, a stem on said valve guided in an opening in the other coupling, and an extension on said valve projecting into the sleeve.

3. In a device of the character described, the combination with a tube and an elastic sleeve, a coupling constituting a gas passage, a metal sleeve securing said coupling to the tube, a metal tube screwed onto said coupling, a second coupling connecting said metal tube with the elastic sleeve, and having a gas passage therethrough, a valve in said metal tube, a spring in said metal tube bearing at its ends against the first mentioned coupling and valve, a stem on said valve projecting through an opening in the first mentioned coupling, and an extension on said valve projecting through the coupling between the metal tube and sleeve, and made angular in cross section, and the end of said extension bent forming an enlargement, substantially as and for the purpose set forth.

4. In a device of the character described, the combination with a tube and an elastic sleeve, of a coupling secured to the tube and having a central opening, and a series of gas passages around said central opening, a metal tube connected to said coupling, a second coupling connecting said metal tube with the sleeve, and having a gas passage therethrough, a spring-pressed valve in said metal tube normally closing against the end of said last mentioned coupling, a stem on said valve projecting through the central opening in the first mentioned coupling, and an extension on said valve projecting through the coupling between the elastic sleeve and valve, and having an enlargement in said elastic sleeve, substantially as set forth.

In testimony whereof I have signed my name to this specification in the presence of two subscribing witnesses.

DENNIS TANGNEY.

Witnesses:
R. H. KRENKEL,
J. A. L. MULHALL.